(12) United States Patent
Chono et al.

(10) Patent No.: US 11,085,827 B2
(45) Date of Patent: Aug. 10, 2021

(54) MEASUREMENT SYSTEM AND COMMUNICATION PROCESSING METHOD IN MEASUREMENT SYSTEM

(71) Applicant: Konica Minolta, Inc., Chiyoda-ku (JP)

(72) Inventors: Hironori Chono, Sakai (JP); Yuzuru Yamamoto, Osakasayama (JP); Satoshi Deishi, Ibaraki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/612,047

(22) PCT Filed: Apr. 19, 2018

(86) PCT No.: PCT/JP2018/016151
§ 371 (c)(1),
(2) Date: Nov. 8, 2019

(87) PCT Pub. No.: WO2018/211904
PCT Pub. Date: Nov. 22, 2018

(65) Prior Publication Data
US 2020/0064193 A1    Feb. 27, 2020

(30) Foreign Application Priority Data

May 16, 2017    (JP) .............................. JP2017-097377

(51) Int. Cl.
*G01J 3/50* (2006.01)
*G01J 3/02* (2006.01)
(Continued)

(52) U.S. Cl.
CPC ............... *G01J 3/50* (2013.01); *G01J 3/0264* (2013.01); *G01J 3/0272* (2013.01); *G01J 3/463* (2013.01); *G06F 21/64* (2013.01)

(58) Field of Classification Search
CPC .......... G01J 3/50; G01J 3/0264; G01J 3/0272; G01J 3/463; G06F 21/64; G08C 25/00
See application file for complete search history.

(56) References Cited

U.S. PATENT DOCUMENTS

| 2013/0080470 A1* | 3/2013 | Stergiou | .............. G06F 19/3418 707/780 |
| 2013/0080843 A1* | 3/2013 | Stergiou | .............. G05B 23/024 714/49 |

(Continued)

FOREIGN PATENT DOCUMENTS

| JP | 2006-166237 | 6/2006 |
| JP | 2017-103510 | 6/2017 |
| WO | WO 2016/098529 | 6/2016 |

*Primary Examiner* — Dominic J Bologna
(74) *Attorney, Agent, or Firm* — Cozen O'Connor

(57) ABSTRACT

Measurement system includes a first device communicably connected to a second device. The first device includes an acquisition unit, a storage unit, and a first calculation unit. The acquisition unit acquires measurement data relating to a physical quantity of a characteristic of an object. The storage unit stores the measurement data. The first calculation unit calculates, from the measurement data, a first value relating to a specific index for the characteristic of the object. The first device transmits the measurement data and data indicating the first value to the second device. The second device includes a second calculation unit, and a comparison unit. The second device receives the measurement data and the first value transmitted from the first device, and calculates a second value relating to the specific index from the measurement data. The comparison unit compares the first value with the second value.

20 Claims, 11 Drawing Sheets

(51) Int. Cl.
*G01J 3/46* (2006.01)
*G06F 21/64* (2013.01)

(56) References Cited

U.S. PATENT DOCUMENTS

| | | | | |
|---|---|---|---|---|
| 2015/0029190 | A1* | 1/2015 | Ishida | G01R 29/0871 |
| | | | | 345/420 |
| 2017/0103285 | A1* | 4/2017 | Le Borgne | G06T 1/0028 |
| 2020/0124582 | A1* | 4/2020 | Dong | A61K 31/4178 |

* cited by examiner

MEASUREMENT SYSTEM AND COMMUNICATION PROCESSING METHOD IN MEASUREMENT SYSTEM

RELATED APPLICATIONS

This is a U.S. National Phase Application under 35 USC 371 of International Application PCT/JP2018/016151 filed on Apr. 19, 2018.

This application claims the priority of Japanese application no. 2017-097377 filed May 16, 2017, the entire content of which is hereby incorporated by reference.

TECHNICAL FIELD

The present invention relates to a measurement system and a communication processing method in the measurement system.

BACKGROUND ART

In recent years, with the spread of information services called cloud computing (also referred to as cloud), data has been centrally managed on servers or the like.

For example, in the field of colorimetry, a technique in which an information processing apparatus receives, through the Internet, a first colorimetric data acquired by measuring the color of a first part of a product and a second colorimetric data acquired by measuring a second part different from the first part, and compares the first colorimetric data with the second colorimetric data has been proposed (for example, see Patent Literature 1). With this technique, for example, if the first and second parts of the same product are produced by different manufactures, the colors can be easily managed.

CITATION LIST

Patent Literature

Patent Literature 1: WO 2016/098529 A

SUMMARY OF INVENTION

Technical Problem

In the technique disclosed in Patent Literature 1, for example, when data is transmitted and received through a communication line such as a network, the data cannot be properly transmitted or received due to a problem of the communication line or a malfunction of a server.

Meanwhile, for example, in the field of colorimetry, colorimetric data acquired by measurement with a measurement device can be changed according to the difference in various measurement conditions, such as temperature, humidity, a measuring person, and illuminance. For this reason, for example, if the color of an object whose colorimetric data has not been properly transmitted and received is remeasured, it is difficult to reproduce the measurement conditions, and to obtain colorimetric data identical to the colorimetric data obtained at the original measurement. Thus, the data loss generated at the time of transmission/reception of colorimetric data causes a serious problem. However, Patent Literature 1 does not mention measures against the loss of colorimetric data.

Incidentally, as a general technique for confirming whether transmission/reception of data has been properly performed, for example, a technique for comparing a hash value calculated by a transmitting device from data to be transmitted with a hash value calculated by a receiving device from received data is known.

However, with the technique for comparing hash values, for example, if a hash value is calculated each time data is transmitted and received, the calculation amount increases in both the transmitting device and the receiving device, and the degree of freedom in using each device decreases.

Thus, for example, in order to reduce the calculation amount required to calculate hash values, when a plurality of (for example, 10) pieces of data is collectively transmitted, one hash value can be calculated for the plurality of pieces of data. However, in this case, for example, if the hash values between the transmitting device and the receiving device do not match, it is difficult to find which data of the plurality of pieces of data has failed in transmission/reception. Thus, it is necessary to perform transmission/reception for all the plurality of pieces of data again. As a result, the calculation amount for transmission/reception of the plurality of pieces of data increases, and the degree of freedom in using each device decreases.

Such a problem is not limited to the field of colorimetry, and is common to general technical fields in which measurement data acquired by measuring a physical quantity relating to a characteristic of an object is transmitted and received.

The present invention has been made in view of the above problems, and is to provide a technology capable of easily confirming whether transmission/reception of measurement data relating to a characteristic of an object has been properly performed while increase in the calculation amount is suppressed.

Solution to Problem

In order to solve the above problems, a measurement system according to an aspect includes a first device and a second device communicably connected to the first device. The first device includes an acquisition unit, a storage unit, a first calculation unit, and a first communication unit. The acquisition unit acquires measurement data relating to a physical quantity of a characteristic of an object. The storage unit stores the measurement data acquired by the acquisition unit. The first calculation unit calculates, from the measurement data, a first value relating to a preset specific index for the characteristic of the object. The first communication unit transmits the measurement data and data indicating the first value to the second device. The second device includes a second communication unit, a second calculation unit, and a comparison unit. The second communication unit receives the measurement data and the first value transmitted from the first device. The second calculation unit calculates, from the measurement data received by the second communication unit, a second value relating to the specific index. The comparison unit compares the first value received by the second communication unit with the second value calculated by the second calculation unit.

A communication processing method in a measurement system according to an aspect of the present invention is a communication processing method in a measurement system including a first device and a second device communicably connected to the first device, and includes a step (a), a step (b), a step (c), a step (d), a step (e), a step (f), and a step (g). In the step (a), measurement data relating to a physical quantity of a characteristic of an object is acquired by the first device. In the step (b), the measurement data is stored in a storage unit by the first device. In the step (c), a first value relating to a preset specific index for the characteristic of the object is calculated from the measurement data by the first device. In the step (d), the measurement data and data indicating the first value calculated in the step (c) is transmitted to the second device by the first device. In the step (e), the measurement data and the first value transmitted in the step (d) are received by the second device. In the step (f), a second value relating to the specific index is calculated from the measurement data received in the step (e). In the step (g), the first value received in the step (e) is compared with the second value calculated in the step (f).

Advantageous Effects of Invention

According to the present invention, for example, a first value to be used by a first device, relating to a specific index, and calculated from measurement data is compared with a second value to be used by a second device and relating to the specific index calculated from the measurement data. Thus, for example, it is possible to easily confirm that measurement data on a transmitting side is identical with measurement data on a receiving side while configurations originally provided in both the transmitting side and the receiving side are used without adding a special configuration. As a result, for example, it is possible to easily check whether transmission/reception of measurement data acquired by measuring a physical quantity relating to a characteristic of an object has been properly performed while increase in the calculation amount is suppressed.

DESCRIPTION OF EMBODIMENTS

Figure 1:
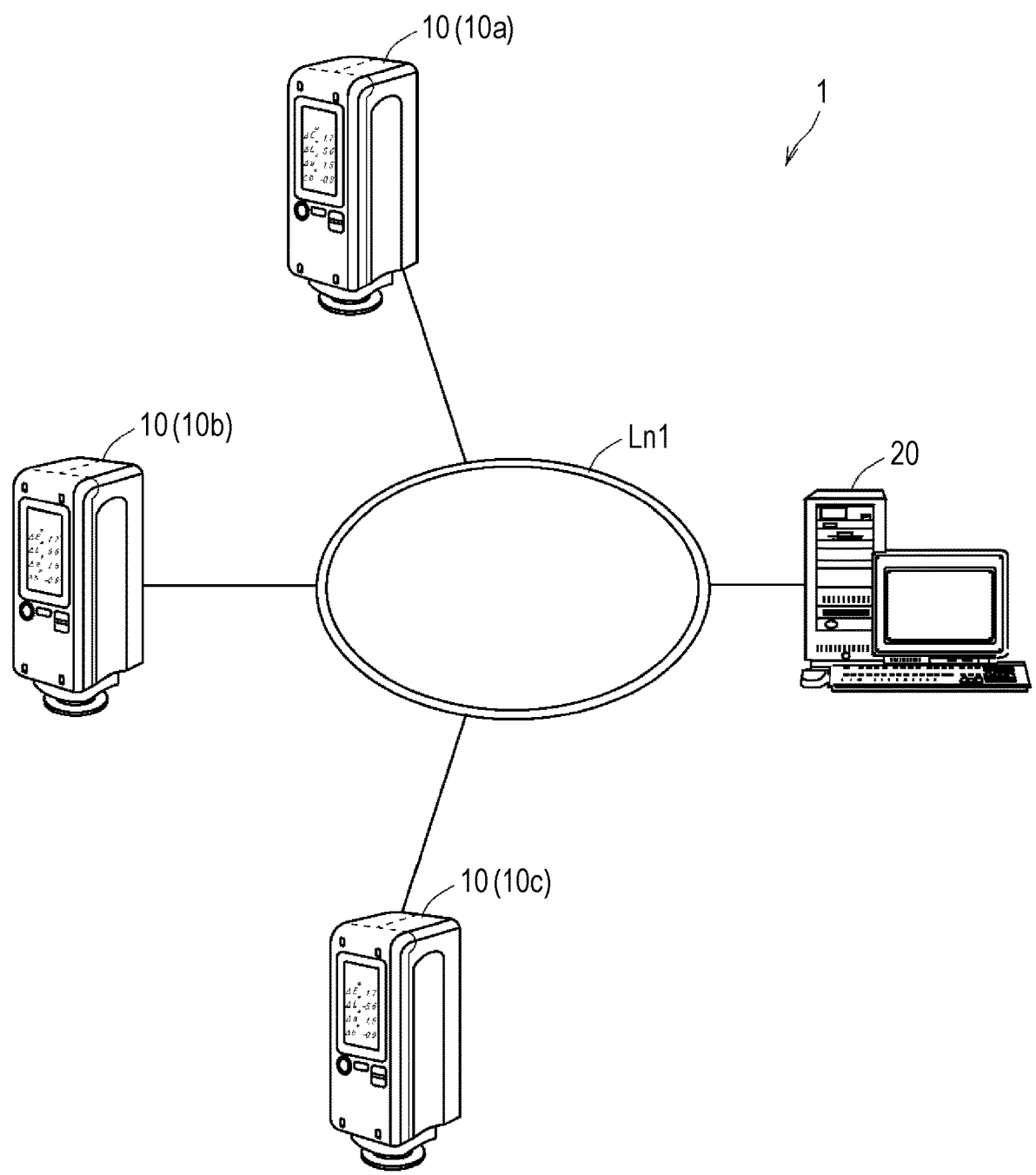
FIG. 1 is a diagram showing an example of a schematic configuration of a measurement system according to a first embodiment.

Hereinafter, embodiments and modifications of the present invention are described with reference to the drawings. In the drawings, elements having similar configurations and functions are denoted by the same reference signs, and redundant descriptions are omitted in the following description. The drawings are schematic.

1. First Embodiment 1-1. Configuration of Measurement System

FIG. 1 is a diagram showing an example of a schematic configuration of a measurement system 1 according to a first embodiment. As shown in FIG. 1, the measurement system 1 includes a measurement device 10 as a first device and a server 20 as a second device. The server 20 is communicably connected to the measurement device 10.

In the example of FIG. 1, the server 20 is communicably connected to a plurality of measurement devices 10 via a communication line Ln1. The measurement devices 10 include three measurement devices 10a, 10b, and 10c. The three measurement devices 10a, 10b, and 10c each have, for example, a similar configuration. To the communication line Ln1, a line capable of wired or wireless communication is applicable and, for example, an internet line or the like is applied.

In the measurement system 1, for example, measurement data relating to a characteristic of an object acquired by the measurement device 10 is transmitted from the measurement device 10 to the server 20, and the measurement data is received by the server 20. Then, it is confirmed whether transmission/reception of the measurement data relating to the characteristic of the object has been properly performed. At this time, in the measurement system 1 according to the first embodiment, for example, both of the measurement device 10 as a transmission side and the server 20 as a reception side can easily perform such confirmation using generally provided configurations without adding a special configuration and operation. This is described below.

1-2. Configuration of Measurement Device

Figure 2:
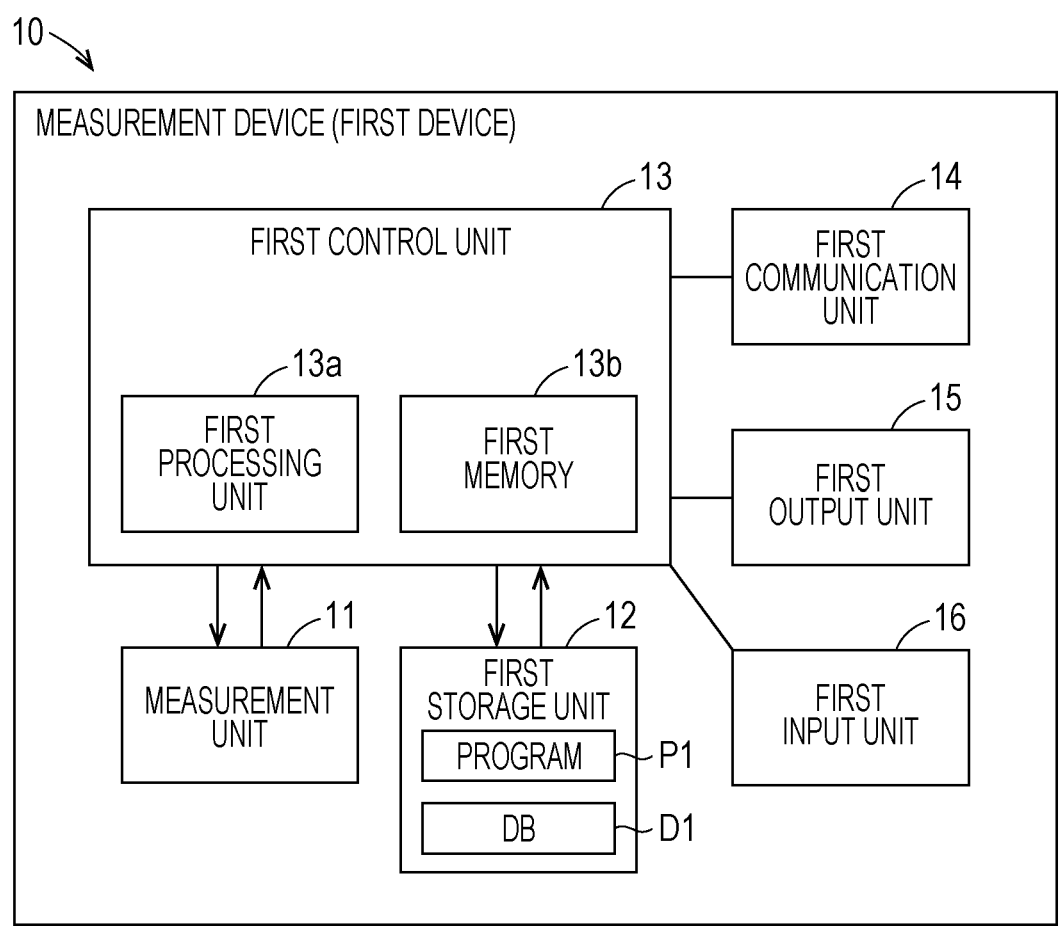
FIG. 2 is a block diagram showing an example of a functional configuration of a measurement device according to the first embodiment.

FIG. 2 is a block diagram showing an example of a functional configuration of the measurement device 10 according to the first embodiment. As shown in FIG. 2, the measurement device 10 includes a measurement unit 11, a first storage unit 12, a first control unit 13, a first communication unit 14, a first output unit 15, and a first input unit 16.

The measurement unit 11 can perform measurement relating to a physical quantity of a characteristic of an object. The measurement unit 11 can acquire data as a measurement result (also referred to as measurement data) by performing this measurement. The objects can include, for example, commodities produced in various industries. In the first embodiment, the characteristic of the object includes the color of the object. In this case, for example, it is possible to easily confirm whether transmission/reception of measurement data acquired by measuring a physical quantity relating to the color of the object has been properly performed while increase in the calculation amount is suppressed.

To the measurement unit 11, for example, a configuration including an integrating sphere, a light source, and a sensor (also referred to as an illumination light receiving unit) can be applied. The integrating sphere is only required to be, for example, a hollow spherical body having the inner wall surface painted with a white paint which diffusely reflects light. The integrating sphere has, for example, three windows (first to third windows). The first window can direct light from the light source into the integrating sphere. The second window can illuminate the object with the light directed from the light source into the integrating sphere and can direct light from the object into the integrating sphere. The third window can direct the light directed from the object into the integrating sphere to the sensor. The sensor has, for example, a spectral part that disperses received light, and a plurality of photoelectric conversion elements that receives the light of each wavelength emitted from the spectral part. Thus, the sensor can acquire, for example, data according to the intensity of light of each wavelength in the received light. For example, the aggregate of the intensity of light of each wavelength acquired by the sensor is the spectral distribution of the light. Data relating to the spectral distribution of the light from the object (also referred to as spectral distribution data) may be acquired by the sensor, for example, in a form of analog signals or in a form of digital signals acquired by converting analog signals (also referred to as A/D conversion). In addition, the measurement unit 11 may acquire, for example, the spectral reflectance on the surface of the object from the spectral distribution. That is, the measurement unit 11 may acquire data indicating the spectral reflectance on the surface of the object (also referred to as spectral reflectance data).

Here, for example, if the object spontaneously emits light, a configuration including an integrating sphere and a sensor may be applied to the measurement unit 11. In other words, a configuration in which the light source is removed from the illumination light receiving unit may be applied to the measurement unit 11. In this case, spectral distribution data corresponding to the color of light according to spontaneous-emission of the object is acquired by the sensor.

As described above, the physical quantity about the characteristic of the object includes, for example, the spectral reflectance on the surface of the object or the spectral distribution of light from the object. Thus, the measurement data acquired by the measurement unit 11 includes, for example, spectral reflectance data or spectral distribution data. For example, if the object does not spontaneously emit light, the measurement unit 11 can acquire spectral reflectance data indicating the spectral reflectance on the surface of the object as the measurement data. At this time, the measurement unit 11 may acquire spectral reflectance data in cooperation with, for example, the first control unit 13. For example, if the object is a display or a lighting device that spontaneously emits light, the measurement unit 11 can acquire spectral distribution data directly indicating the spectral distribution of light from the object as the measurement data.

The first storage unit 12 can store, for example, the measurement data acquired by an acquisition unit 130 (FIG. 3) to be described later. Thus, in the first storage unit 12, a database D1 in which measurement data is accumulated is constructed. The first storage unit 12 includes, for example, a non-volatile storage medium. The first storage unit 12 can also store, for example, a program P1. The first storage unit 12 may include a first memory 13b to be described later.

Figure 3:
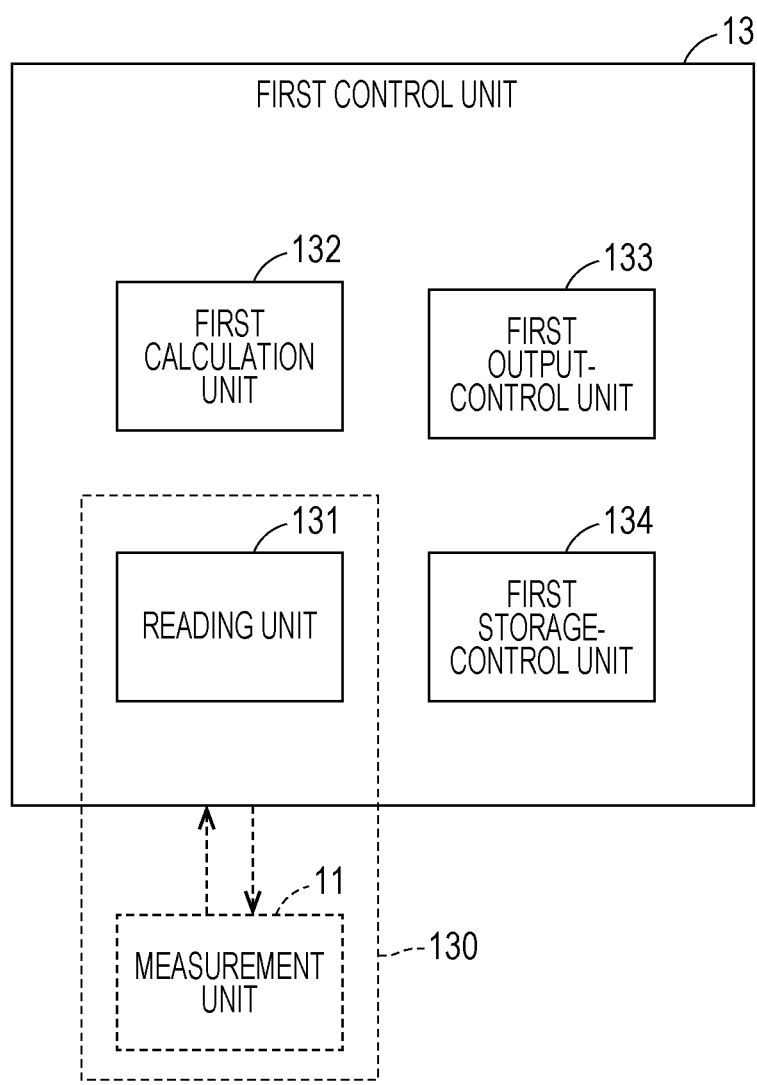
FIG. 3 is a block diagram showing an example of a functional configuration implemented in a first control unit of the measurement device.

The first control unit 13 can centrally control, for example, the units of the measurement device 10. The first control unit 13 includes a first processing unit 13a and a first memory 13b. The first processing unit 13a includes, for example, one or more processors. The first memory 13b includes, for example, one or more volatile memories. Here, the first control unit 13 can implement various functions by reading and executing the program P1 stored in the first storage unit 12. FIG. 3 is a block diagram showing a functional configuration implemented in the first control unit 13. As shown in FIG. 3, the configuration functionally implemented in the first control unit 13 includes, for example, a reading unit 131, a first calculation unit 132, a first output-control unit 133, and a first storage-control unit 134.

For example, the reading unit 131 can read the measurement data acquired by the measurement unit 11 at an appropriate timing and output the read data to the first calculation unit 132. For example, if the measurement unit 11 includes a unit that performs A/D conversion for converting an analog signal into a digital signal (also referred to as an A/D conversion unit), the reading unit 131 may output the measurement data acquired by the measurement unit 11 directly to the first calculation unit 132. Alternatively, for example, if the measurement unit 11 does not include an A/D conversion unit, the reading unit 131 may perform A/D conversion. In addition, for example, the reading unit 131 may appropriately perform calculations, such as calibration and correction, on the measurement data. As described above, the reading unit 131 and the measurement unit 11 constitute an acquisition unit 130 that acquires the measurement data relating to the physical quantity of the characteristic of the object.

The first calculation unit 132 can calculate, for example, a value relating to a preset specific index for the characteristic of the object (also referred to as a first value) from the measurement data acquired by the acquisition unit 130. The specific index can include, for example, an index for the color of the object. To the index for the color, values of various color systems, such as an XYZ color system, an L*a*b* color system, and an L*c*h* color system, can be applied. For example, values of the XYZ color system are called tristimulus values (X value, Y value, Z value). In addition, the first calculation unit 132 can calculate, in response to, for example, the acquisition unit 130 acquiring the measurement data, a first value relating to the specific index from the measurement data. The first calculation unit 132 may perform calculation for adding various corrections and calibrations, when, for example, the first value is calculated from the measurement data. Incidentally, a measurement device that measures the color of an object generally incorporates a function, such as the first calculation unit 132, for converting spectral distribution data or spectral reflectance data acquired in measurement into values of one or more types of color systems, which are indices for colors. In the measurement device 10 according to the first embodiment, for example, the first value can be used in order for the first output unit 15 to outputs visually or audibly. Thus, for example, the values of the color systems, such the XYZ color system, the L*a*b* color system, and the L*c*h* color system, can be immediately recognized by the user of the measurement device 10 as a measurement result.

The first output-control unit 133 can control, for example, various outputs of the first output unit 15.

The first storage-control unit 134 can control, for example, writing of data to the first storage unit 12, and reading and deleting of data from the first storage unit 12. For example, the first storage-control unit 134 may delete the measurement data stored in the database D1 of the first storage unit 12 in response to reception of a signal from the server 20 (also referred to as a second signal) when transmission/reception of the measurement data between the measurement device 10 and the server 20 has been properly performed. The second signal includes, for example, information identifying target measurement data, and information permitting deletion of the measurement data, or information indicating that transmission/reception has been properly performed. For example, a file name and tag information are applied to the information identifying the measurement data. In this manner, for example, if the measurement data whose transmission/reception has been properly performed is deleted from the first storage unit 12, the storage capacity of the first storage unit 12 of the measurement device 10 can be used effectively. In this case, for example, since the measurement data is deleted after transmission/reception has been properly performed, the loss of the measurement data is hardly generated.

The first communication unit 14 can communicate with a device outside the measurement device 10 through, for example, the communication line Ln1. The first communication unit 14 can transmit, for example, the measurement data acquired by the acquisition unit 130 and data indicating the first value calculated from the measurement data by the first calculation unit 132 (also referred to as first value data) to the server 20. That is, the first communication unit 14 transmits the measurement data in combination with the first value data indicating the first value relating to the measurement data. For example, the first communication unit 14 may transmit, in response to the first calculation unit 132 calculating the first value, the first value and the measurement data from which the first value has been calculated to the server 20. In this case, for example, as long as measurement data and its first value are transmitted to the server 20 every time the measurement device 10 acquires measurement data, the loss of the measurement data that has been transmitted to the server 20 is hardly generated if the measurement data is erroneously deleted in the measurement device 10 afterward. That is, the loss of the measurement data can be decreased. At this time, for example, it is possible for the server 20 to easily confirm whether transmission/reception of each measurement data has been properly performed, and to easily take some action for each measurement data if transmission/reception of measurement data has not been properly performed.

In addition, for example, if transmission/reception of measurement data between the measurement device 10 and the server 20 has not been properly performed, the first communication unit 14, may retransmit the measurement data and the first value to the server 20 in response to reception of a first signal from the server 20 to be described later. This can, for example, decrease the loss of the measurement data.

The first output unit 15 can output, for example, various types of information. The first output unit 15 can include, for example, a display unit and a speaker. The display unit can, for example, visually output various types of information in a manner that can be recognized by the user. The display unit may have, for example, a form of a touch panel integrated with the first input unit 16. The speaker can, for example, audibly output various types of information in a manner that can be recognized by the user.

The first input unit 16 can input, for example, a signal corresponding to an operation or the like of a user who uses the measurement device 10. The first input unit 16 can include, for example, an operation unit, a microphone, and various sensors. The operation unit can include, for example, a mouse and a keyboard that can input a signal according to the user's operation. The microphone can, for example, input a signal according to the user's voice. The various sensors can input, for example, signals according to the user's operation.

1-3. Configuration of Server

Figure 4:
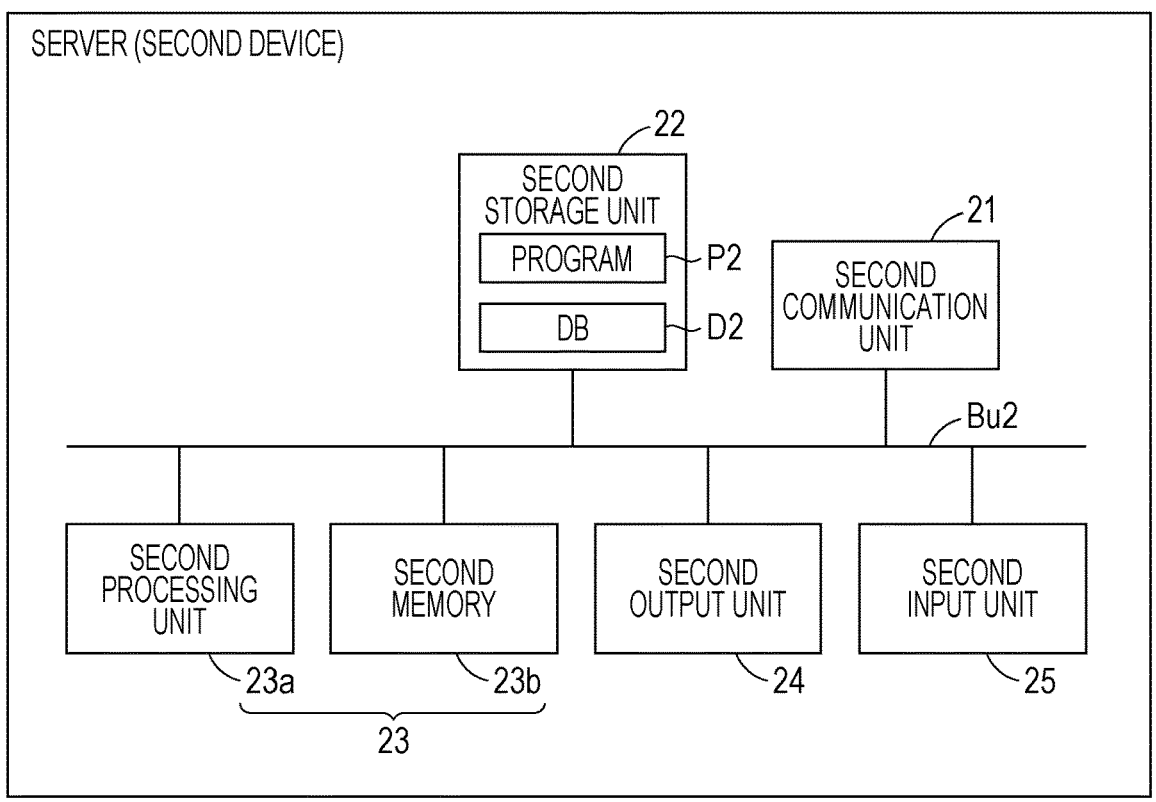
FIG. 4 is a block diagram showing an example of a functional configuration of a server according to the first embodiment.

FIG. 4 is a block diagram showing an example of a functional configuration of the server 20 according to the first embodiment. As shown in FIG. 4, the server 20 is implemented by, for example, a computer, and includes a second communication unit 21, a second storage unit 22, a second control unit 23, a second output unit 24, and a second input unit 25 that are connected to each other via a bus line Bu2.

The second communication unit 21 can receive, for example, the measurement data and the first value transmitted from the measurement device 10. Here, for example, the second communication unit 21 receives the measurement data in combination with the first value data relating to the measurement data.

The second storage unit 22 can store, for example, the measurement data transmitted from the measurement device 10. Thus, in the second storage unit 22, a database D2 in which measurement data is accumulated is constructed. The second storage unit 22 includes, for example, a non-volatile storage medium. The second storage unit 22 may include a second memory 23b to be described later. The second storage unit 22 can also store, for example, a program P2. In addition, the database D2 of the second storage unit 22 can store, for example, the measurement data received by the second communication unit 21 in association with the first value data relating to the measurement data. The second storage unit 22 can further store, for example, information indicating that measurement data and the first value are to be transmitted from a specific measurement device 10, and information indicating that the same calculation rule as the calculation rule for calculating the first value from the measurement data.

Figure 5:
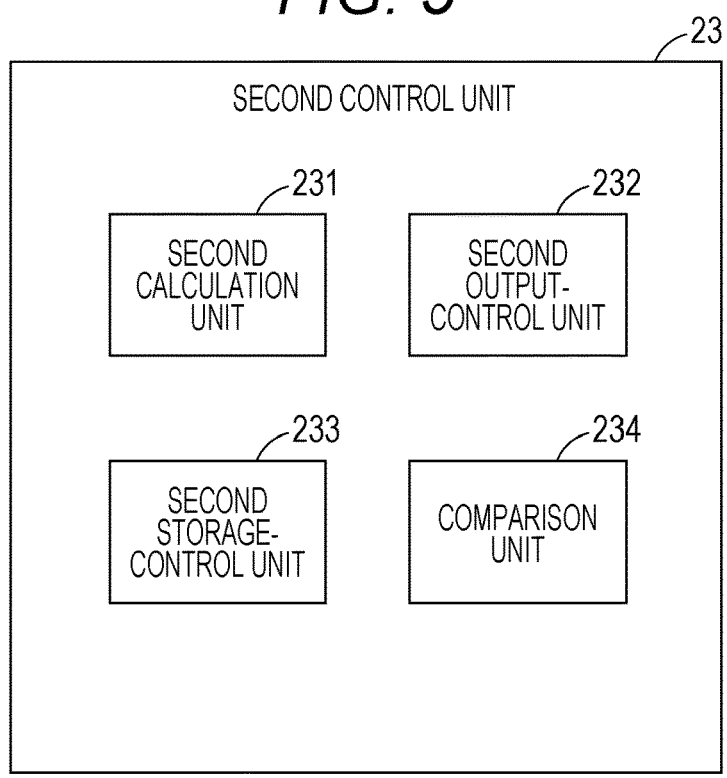
FIG. 5 is a block diagram showing an example of a functional configuration implemented in a second control unit of the server.

The second control unit 23 can centrally control, for example, the units of the server 20. The second control unit 23 includes a second processing unit 23a and a second memory 23b. The second processing unit 23a includes, for example, one or more processors. The first memory 13b includes, for example, one or more volatile memories. Here, the second control unit 23 can implement various functions by reading and executing the program P2 stored in the second storage unit 22. FIG. 5 is a block diagram showing a functional configuration implemented in the second control unit 23. As shown in FIG. 5, the configuration functionally implemented in the second control unit 23 includes, for example, a second calculation unit 231, a second output-control unit 232, a second storage-control unit 233, and a comparison unit 234.

The second calculation unit 231 can calculate, for example, a value relating to a preset specific index for the characteristic of the object (also referred to as a second value) from the measurement data received by the second communication unit 21. The second calculation unit 231 calculates a second value with, for example, the same calculation as the calculation for the first calculation unit 132 to calculate the first value from the measurement data. In addition, the second calculation unit 231 can calculate, in response to, for example, the second communication unit 21 receiving the measurement data, the second value relating to the specific index from the measurement data. Incidentally, a device that uses measurement data received from a measurement device that measures the color of an object generally incorporates a function, such as the second calculation unit 231, for converting spectral distribution data or spectral reflectance data acquired in measurement into values of one or more types of color systems, which are indices for colors. In the server 20 according to the first embodiment, for example, the second value can be used in order for the second output unit 24 to outputs visually or audibly. Thus, for example, the values of various color systems, such as the XYZ color system and the L*a*b* color system, can be recognized by the user of the server 20 as a measurement result.

The second output-control unit 232 can control, for example, various outputs of the second output unit 24.

The second storage-control unit 233 can control, for example, writing of data to the second storage unit 22, and reading and deleting of data from the second storage unit 22.

The comparison unit 234 can, for example, compare the first value received by the second communication unit 21 with the second value calculated by the second calculation unit 231. Specifically, for example, the first value is compared with the second value calculated by the second calculation unit 231 from the measurement data received in combination with the first value. At this time, for example, if a comparison result that the first value has matched the second value is acquired, the measurement data transmitted from the measurement device 10 is assumed to be identical with the measurement data received by the server 20. As a result, it can be confirmed that transmission/reception of the measurement data has been properly performed.

Here, for example, the first value to be generally used by the measurement device 10 as the transmission side, relating to the specific index, and calculated from the measurement data and the second value to be generally used by the server 20 as the reception side, relating to the specific index, and calculated from the measurement data are used. Thus, for example, by using the configurations originally provided in both of the measurement device 10 and the server 20 without adding a special configuration, it is possible to confirm for each measurement data that the measurement data on the transmission side is identical with the measurement data on the reception side. As a result, for example, it is possible to easily check whether transmission/reception of measurement data acquired by measuring a physical quantity relating to a characteristic of an object has been properly performed while increase in the calculation amount is suppressed. In addition, for example, a problem that new measurement cannot be started due to the increase in the calculation amount in the measurement device 10 on the transmission side hardly occurs. Furthermore, for example, excessive improvement in the performance of the processors of both of the measurement device 10 as the transmission side and the server 20 as the reception side can be avoided due to the reduction in the calculation amount.

Here, for example, in response to the comparison unit 234 not recognizing that the first value has matched the second value, the second communication unit 21 may transmit a preset signal (also referred to as a first signal) to the measurement device 10. The first signal includes, for example, information identifying target measurement data, and information requesting retransmission of the measurement data or information indicating a failure in transmission/reception. For example, a file name and tag information are applied to the information identifying the measurement data. In this case, for example, if the transmission/reception of each measurement data has not been properly performed for each measurement data, the first signal reaches the measurement device 10. At this time, for example, the user can take an action such as retransmission of the measurement data from the measurement device 10 to the server 20. Here, as information identifying the measurement data to be retransmitted, for example, a file name or tag information of measurement data can be used. In the server 20, for example, if the comparison unit 234 recognizes that the first value has matched the second value, data indicating the compared second value (also referred to as second value data) and the measurement data from which the second value has been calculated may be stored in the database D2 of the second storage unit 22.

Alternatively, for example, in response to the comparison unit 234 recognizing that the first value has matched the second value, the second communication unit 21 may transmit the preset second signal to the measurement device 10. In this case, for example, if transmission/reception of the measurement data has been properly performed, the second signal reaches the measurement device 10. At this time, for example, in the measurement device 10, the measurement data whose transmission/reception has been performed can be deleted from the database D1 of the first storage unit 12. As a result, for example, the storage capacity of the first storage unit 12 in the measurement device 10 can be used effectively. In addition, for example, measurement data can be deleted after the transmission/reception has been properly performed, and the loss of the measurement data is hardly generated.

The second output unit 24 can output, for example, various types of information. The second output unit 24 can include, for example, a display unit and a speaker similarly to the first output unit 15. Here, the display unit may have a form of a touch panel integrated with the second input unit 25.

The second input unit 25 can input, for example, a signal corresponding to an operation or the like of a user who uses the server 20. The second input unit 25 can include, for example, an operation unit, a microphone, and various sensors similarly to the first input unit 16 described above.

1-4. Communication Processing Method in Measurement System

Next, a communication processing method in the measurement system 1 according to the first embodiment is described.

Figure 6:
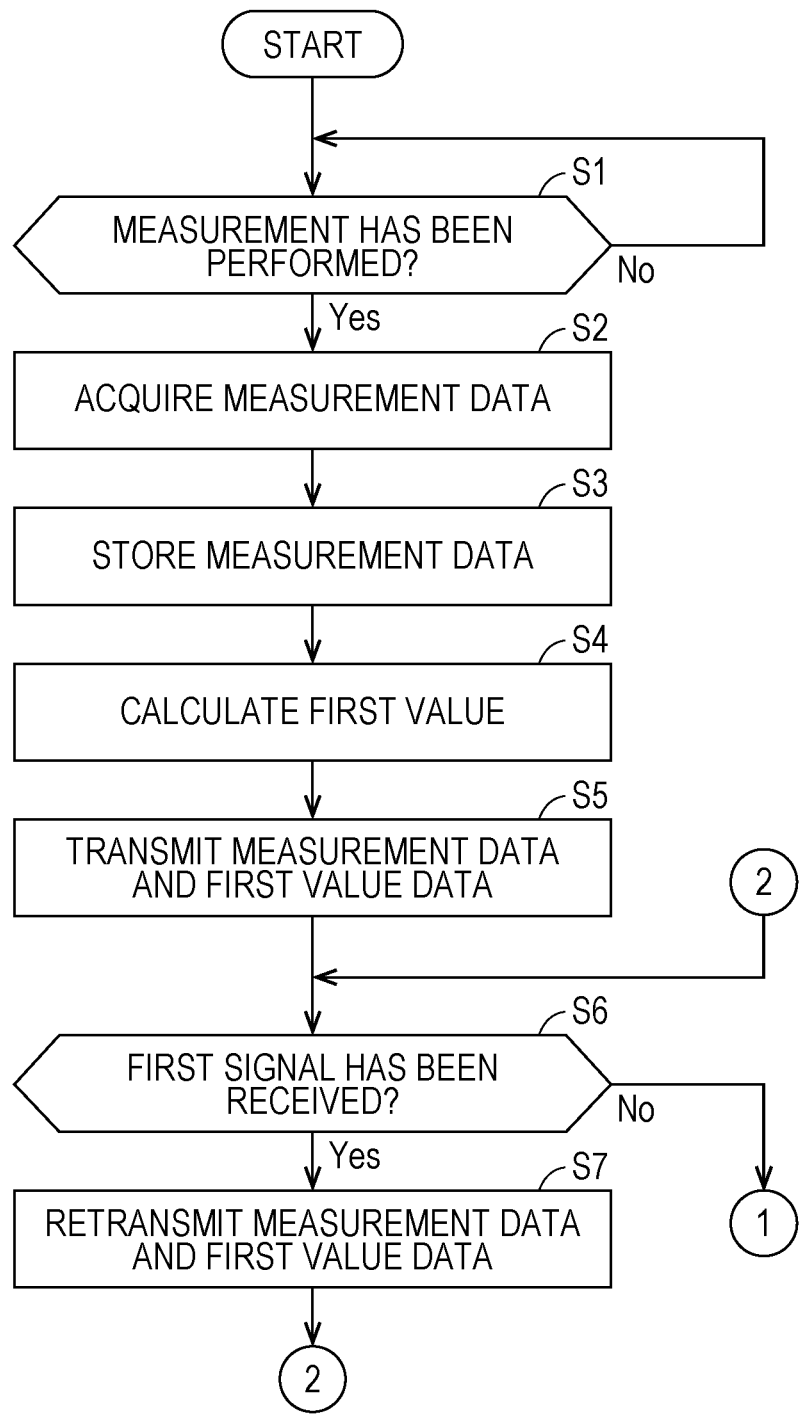
FIG. 6 is a flowchart showing an example of a procedure of a communication processing method according to the first embodiment.
Figure 7:
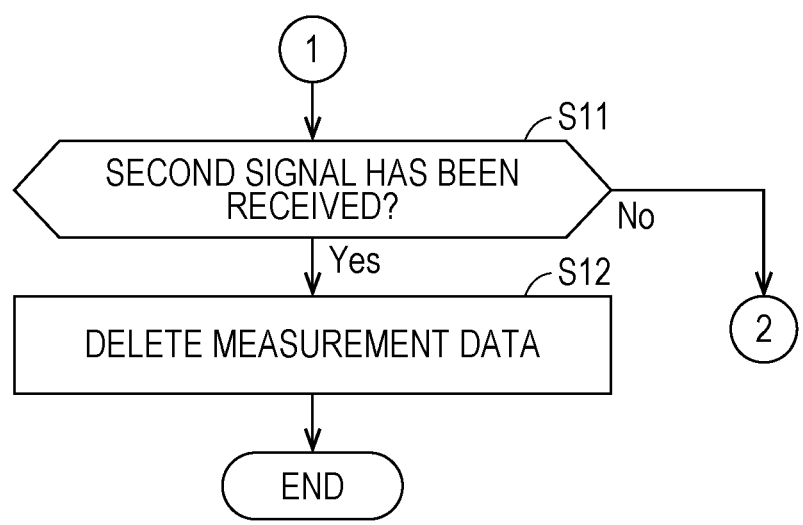
FIG. 7 is a flowchart showing an example of a procedure of the communication processing method according to the first embodiment.
Figure 8:
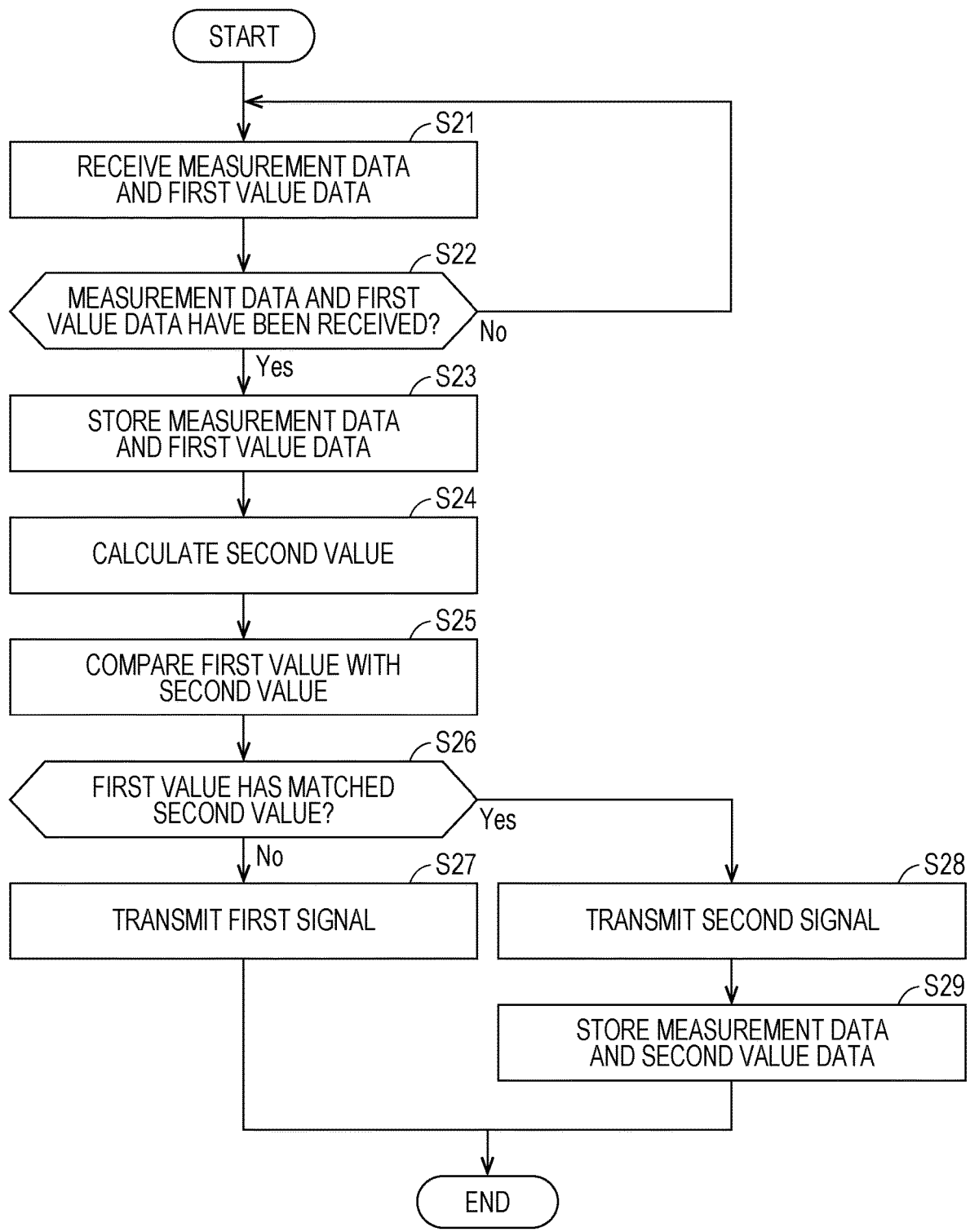
FIG. 8 is a flowchart showing an example of a procedure of the communication processing method according to the first embodiment.

FIGS. 6 to 8 are flowcharts showing an example of a procedure of a communication processing method in the measurement system 1. FIGS. 6 and 7 are flowcharts showing an example of a procedure of a communication processing method in the measurement device 10. The procedure of the communication processing method can be performed by, for example, the first control unit 13 executing the program P1. FIG. 8 is a flowchart showing an example of a procedure of the communication processing method in the server 20. The procedure of the communication processing method can be performed by, for example, the second control unit 23 executing the program P2.

First, in step S1 of FIG. 6, the first control unit 13 determines whether measurement has been performed by the measurement unit 11. Here, the determination in step S1 is repeated until measurement has been performed by the measurement unit 11. When measurement has been performed by measurement unit 11, the procedure proceeds to step S2.

In step S2, the acquisition unit 130 acquires measurement data relating to a physical quantity of a characteristic of an object, and the procedure proceeds to step S3. Here, for example, spectral reflectance data can be applied to the measurement data.

In step S3, the first storage-control unit 134 stores, in the first storage unit 12, the measurement data acquired in step S2, and the procedure proceeds to step S4. At this time, the database D1 is constructed or updated in the first storage unit 12.

In step S4, the first calculation unit 132 calculates a first value relating to a preset specific index of the characteristic of the object from the measurement data acquired in step S2, and the procedure proceeds to step S5. Here, for example, if the measurement data is spectral reflectance data, a tristimulus value (X, Y, Z) or the like is applied to the first value.

In step S5, the first communication unit 14 transmits the measurement data acquired in step S2 and data indicating the first value calculated in step S4 (first value data) to the server 20, and the procedure proceeds to step S6.

In step S6, the first control unit 13 determines whether a first signal from the server 20 has been received by the first communication unit 14. Here, if the first signal has been received, the procedure proceeds to step S7, or if the first signal has not been received, the procedure proceeds to step S11 of FIG. 7.

In step S7, the first communication unit 14 retransmits the measurement data and the first value data to the server 20, and the processing returns to step S6. At this time, for example, the measurement data to be retransmitted can be identified based on the information identifying the measurement data included in the first signal.

In step 311 of FIG. 7, the first control unit 13 determines whether a second signal from the server 20 has been received by the first communication unit 14. Here, if the second signal has been received, the procedure proceeds to step S12, or if the second signal has not been received, the processing returns to step S6 of FIG. 6.

In step S12, the first storage-control unit 134 deletes the measurement data stored in the database D1 of the first storage unit 12, and the operation procedure is terminated. Here, for example, the measurement data identified by the second signal is deleted.

Meanwhile, in step S21 of FIG. 8, the second communication unit 21 receives the measurement data and the first value data, and the procedure proceeds to step S22.

In step S22, the second control unit 23 determines whether the second communication unit 21 has received the measurement data and the first value data in step S21. Here, if the second communication unit 21 has not received the measurement data and the first value data, the processing returns to step S21. On the other hand, if the second communication unit 21 has received the measurement data and the first value data, the procedure proceeds to step S23.

In step S23, the second storage-control unit 233 stores the measurement data and the first value data received in step S21 in the database D2 of the second storage unit 22, and the procedure proceeds to step S24.

In step S24, the second calculation unit 231 calculates a second value relating to the preset specific index of the characteristic of the object from the measurement data received in step S21, and the procedure proceeds to step S25.

Here, for example, if the measurement data is spectral reflectance data, a tristimulus value (X, Y, Z) or the like is applied to the second value.

In step S25, the comparison unit 234 compares the first value indicated by the first value data received in step S21 with the second value calculated in step S24, and the procedure proceeds to step S26.

In step S26, the comparison unit 234 determines whether the first value has matched the second value based on the comparison result in step S25. Here, if the first value has not matched the second value, the procedure proceeds to step S27, or if the first value has matched the second value, the procedure proceeds to step S28.

In step S27, the second communication unit 21 transmits a first signal to the measurement device 10, and the operation procedure is terminated. Here, the first signal is, for example, a signal for requesting retransmission of the measurement data.

In step S28, the second communication unit 21 transmits a second signal to the measurement device 10, and the procedure proceeds to step S29.

In step S29, the second storage-control unit 233 stores, in the second storage unit 22, the measurement data received in step S21 and the second value data calculated in step S24, and the operation procedure is terminated. At this time, the database D2 is constructed or updated in the second storage unit 22. In step S29, instead of the second value data calculated in step S24, the first value data received in step S21 may be stored in the second storage unit 22.

1-5. Summary of First Embodiment

As described above, in the measurement system 1 according to the first embodiment, for example, the measurement device 10 as the transmission side transmits colorimetric data and a first value relating to a specific index calculated from the colorimetric data to the server 20. Then, the server 20 calculates a second value relating to the specific index from the received colorimetric data, and compares the second value with the received first value. Here, for example, an additional calculation for calculating a hash value from measurement data is unnecessary. Instead, for example, the first value to be generally used by the measurement device 10, relating to the specific index, and calculated from the measurement data and the second value to be generally used by the server 20, relating to the specific index, and calculated from measurement data are used. Thus, for example, by using the configurations originally provided in both of the measurement device 10 and the server 20 without adding a special configuration, it is possible to confirm for each measurement data that the measurement data on the transmission side is identical with the measurement data on the reception side. As a result, for example, it can be easily confirmed whether transmission/reception of measurement data has been properly performed while increase in the calculation amount is suppressed.

2. Other Embodiments

The present invention is not limited to the above first embodiment, and various changes, improvements, and the like can be made without departing from the scope of the present invention.

2-1. Second Embodiment

For example, in the first embodiment, when transmission/reception of measurement data between the measurement device 10 and the server 20 has not been properly performed, the first output unit 15 may perform a first output in response to the reception of the first signal from the server 20. At this time, as the first output, for example, a preset output in an aspect that can be recognized by the user is performed. Specifically, to the first output, an output such as information indicating a failure in transmission/reception of measurement data and information requesting retransmission of measurement data to the server 20 can be applied. As a result, for example, the user of the measurement device 10 can take various actions including checking and repairing of the measurement device 10 and the communication line Ln1, and retransmission of the measurement data. In addition, for example, the user of the measurement device 10 can avoid repetition of transmission/reception that has not been properly performed.

Figure 9:
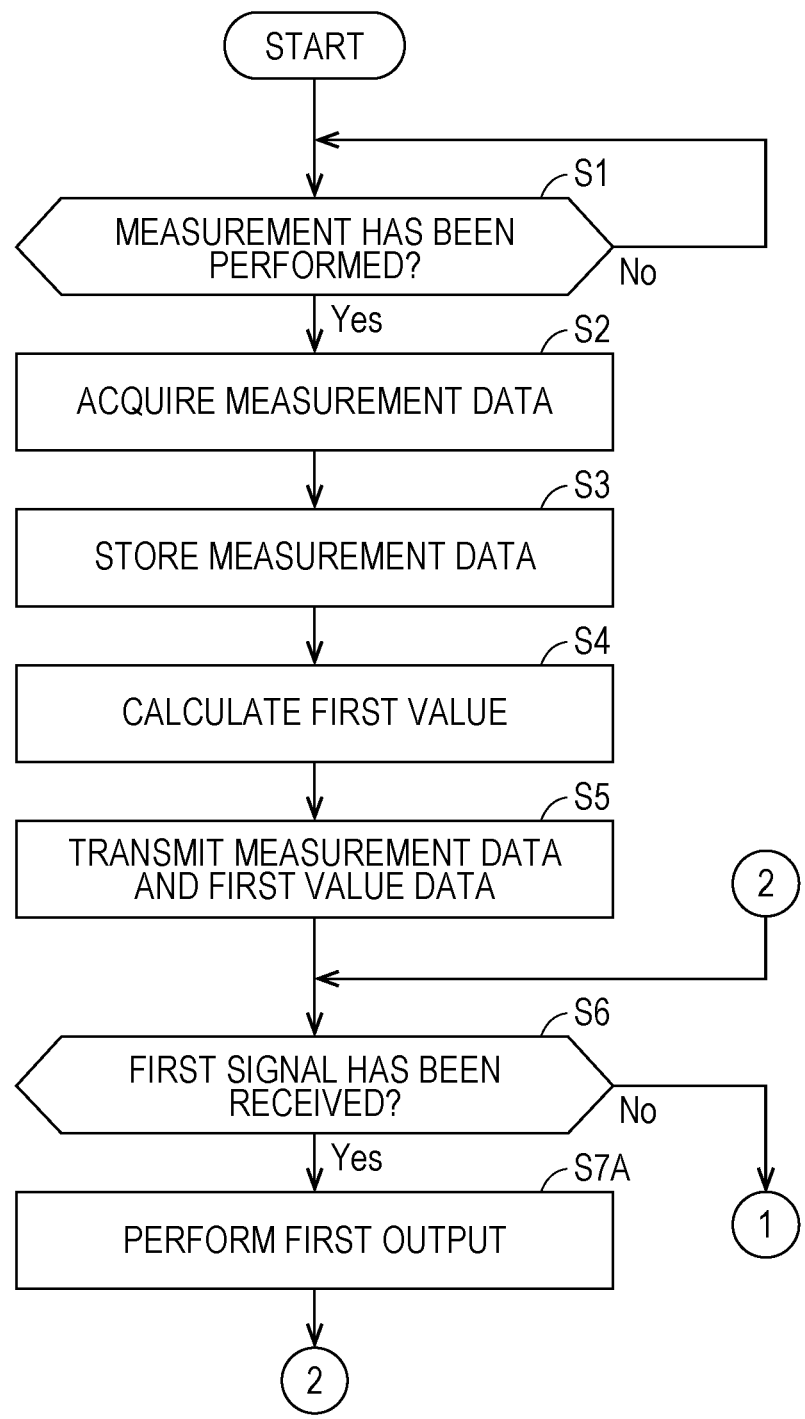
FIG. 9 is a flowchart showing an example of a procedure of a communication processing method according to a second embodiment.

When the above configuration is employed, the procedure of the communication processing method shown in FIG. 6 may be changed to a procedure of a communication processing method shown in FIG. 9, for example. Specifically, instead of the retransmission of the measurement data and the first value data in step S7, a first output in step S7A may be performed.

2-2. Third Embodiment

For example, in the above embodiments, when it is recognized that the first value has matched the second value, the measurement device 10 may request, in response to the reception of a second signal, the user to determine whether to delete measurement data before the measurement data stored in the database D1 of the first storage unit 12 is deleted. At this time, for example, the measurement data whose transmission/reception has been properly performed can be deleted from the database D1 of the first storage unit 12 according to the determination of the user. Thus, for example, the loss of the measurement data is hardly generated while the storage capacity of the first storage unit 12 in the measurement device 10 is used effectively. As a result, for example, the measurement data can be safely deleted. Furthermore, for example, the measurement data can be backed up in the measurement device 10 according to the user's intention.

Figure 10:
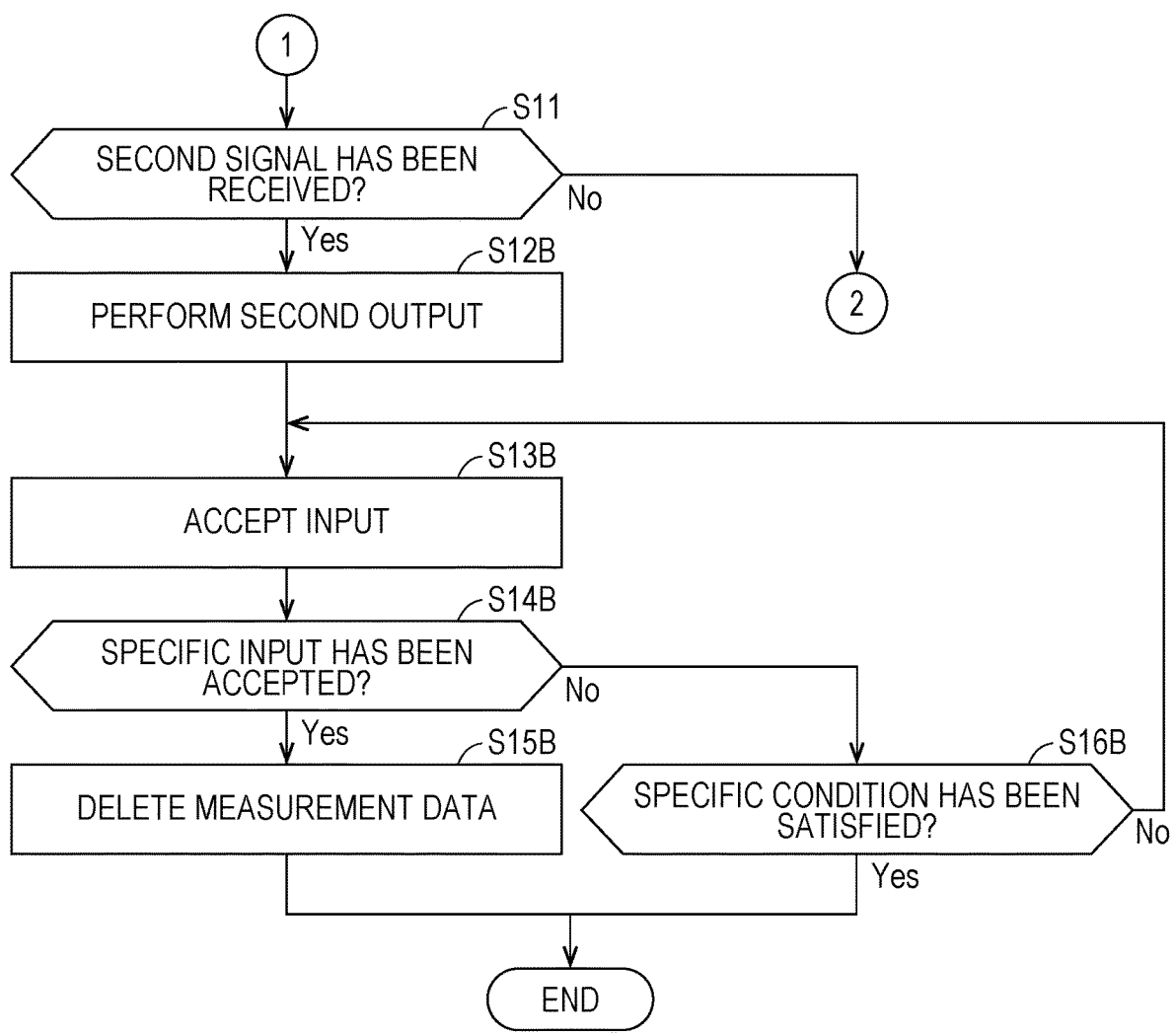
FIG. 10 is a flowchart showing an example of a procedure of a communication processing method according to a third embodiment.

When the above configuration is employed, the procedure of the communication processing method shown in FIG. 7 may be changed to a procedure of a communication processing method shown in FIG. 10, for example. Specifically, instead of the processing of step S12, the processing from steps S12B to S16B may be performed.

Here, in step S12B, in response to the first communication unit 14 receiving the second signal, the first output unit 15 performs a preset second output in an aspect that can be recognized by the user. At this time, to the second output, for example, an output of information requesting the user to determine whether the measurement data in the database D1 of the first storage unit 12 is either deleted or saved is applied. Here, for example, a screen capable of selecting whether the measurement data is deleted or saved (also referred to as a selection screen) can be displayed on the display unit of the first output unit 15.

In step S13B, the first input unit 16 accepts an input according to the user's operation, and the procedure proceeds to step S14B. At this time, for example, the first input unit 16 accepts a specific input according to the user's operation. To the specific input, for example, an input of information determining that the measurement data is deleted from the first storage unit 12 is applied. Specifically, for example, deletion of the measurement data can be selected on the selection screen displayed on the display unit of the first output unit 15.

In step S14B, the first control unit 13 determines whether the first input unit 16 has accepted the specific input. Here, if the first input unit 16 has accepted the specific input, the procedure proceeds to step S15B, or if the first input unit 16 has not accepted the specific input, the procedure proceeds to step S16B.

In step S15B, similarly to step S12 (FIG. 7), the first storage-control unit 134 deletes the measurement data stored in the database D1 of the first storage unit 12, and the operation procedure is terminated. In this manner, in steps S12B to S15B, the first storage-control unit 134 deletes the measurement data stored in the database D1 of the first storage unit 12 in response to the first input unit 16 accepting the specific input while the first output unit 15 is performing the second output.

In step S16B, the first control unit 13 determines whether a specific condition has been satisfied. Here, to the specific condition, for example, the selection of saving of the measurement data on the selection screen or the elapse of a preset time is applied. If the specific condition has not been satisfied, the processing returns to step S13B, or if the certain condition has been satisfied, the operation procedure is terminated.

2-3. Fourth Embodiment

For example, in the above embodiments, in response to the comparison unit 234 not recognizing that the first value has matched the second value, the second output unit 24 may perform a preset third output in an aspect that can be recognized by the user. As the third output, for example, a preset output in an aspect that can be recognized by the user is performed. Specifically, to the third output, for example, an output of information indicating a failure in transmission/reception of measurement data can be applied. Thus, for example, when transmission/reception of measurement data has not been properly performed, the third output is performed in an aspect that can be recognized by the user. Accordingly, the user of the server 20 can take various actions such as checking and repairing of the measurement device 10, the server 20, or the communication line Ln1, and requesting retransmission of measurement data. In addition, for example, the user can avoid repetition of transmission/reception that has not been properly performed.

Figure 11:
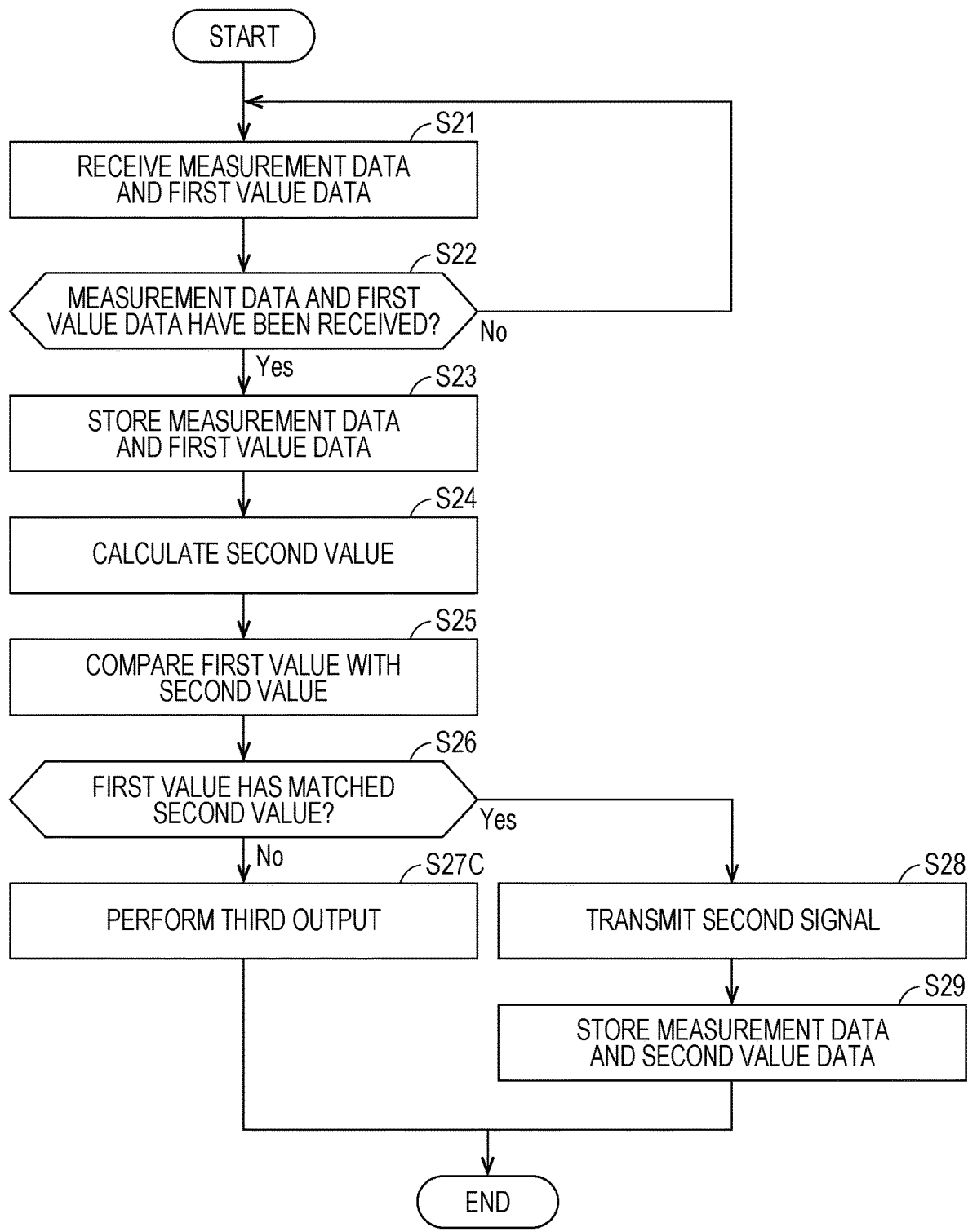
FIG. 11 is a flowchart showing an example of a procedure of a communication processing method according to a fourth embodiment.

When the above configuration is employed, the procedure of the communication processing method shown in FIG. 8 may be changed to a procedure of a communication processing method shown in FIG. 11, for example. Specifically, instead of the transmission of the first signal in step S27, a third output in step S27C may be performed.

2-4. Fifth Embodiment

Figure 12:
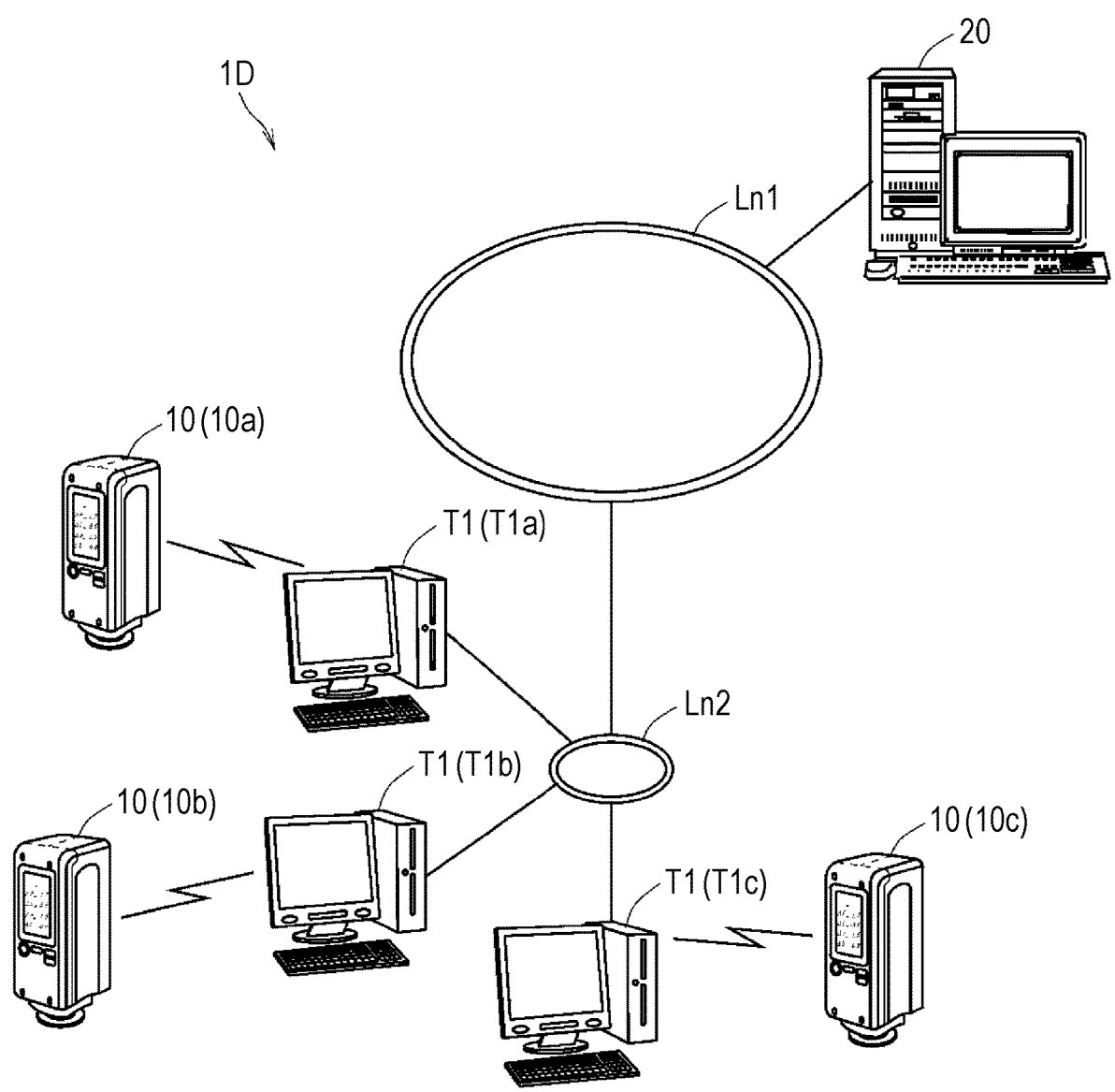
FIG. 12 is a diagram showing an example of a schematic configuration of a measurement system according to a fifth embodiment.

For example, in the above embodiments, a measurement system 1D having the measurement system 1 as a basic configuration, in which the measurement device 10 and the server 20 are communicably connected to each other via another device (also referred to as a relay device) as shown in FIG. 12, may be employed. In the example of FIG. 12, the measurement device 10 and a terminal device T1 as another device are communicably connected by near field communication. Specifically, a measurement device 10a and a terminal device T1a are communicably connected, a measurement device 10b and a terminal device T1b are communicably connected, and a measurement device 10c and a terminal device T1c are communicably connected. In addition, the terminal device T1 and the server 20 are communicably connected via communication lines Ln1 and Ln2. Here, for example, the communication line Ln2 can be a local area network (LAN) line, and the communication line Ln1 can be an Internet line. To the terminal device T1, for example, a general personal computer or the like is applied.

With such a configuration, for example, the measurement device 10 may acquire measurement data, and the terminal device T1 may calculate a first value relating to a specific index from the measurement data. In this case, the terminal device T1 does not include the measurement unit 11, but it can be said that the terminal device T1 includes an acquisition unit that acquires the measurement data from the measurement device 10 instead of the acquisition unit 130. In addition, the terminal device T1 may further include functions of the first storage unit 12 that stores the measurement data, the first calculation unit 132 that calculates a first value relating to the specific index from the measurement data, and the first communication unit 14 that transmits the measurement data and first value data to the server 20. That is, the terminal device T1 may serve as the first device.

3. Others

For example, in the above embodiments, the measurement device 10 may collectively perform calculation of first values of one or more pieces of measurement data and transmission of measurement data to the server 20 at a preset timing.

For example, in the embodiments and the modifications described above, the values of color systems that constitute the first value and the second value are at least a part of the values of one or more color systems. For example, the first value and the second value may be one or more of tristimulus values X, Y, Z of the XYZ color system.

For example, in the embodiments and the modifications described above, another device having a configuration similar to the configuration relating to transmission/reception of measurement data in the server 20, such as the second communication unit 21, the second calculation unit 231, and the comparison unit 234, may be employed as the second device, instead of the server 20.

For example, in the embodiments and the modifications described above, if the measurement unit 11 includes a tristimulus-value direct-reading-type sensor, measurement data acquired by the acquisition unit 130 may be a tristimulus value. In this case, for example, the value of a color system different from the XYZ color system (such as the L*a*b* color system) can be applied to each of the first value and the second value.

For example, in the embodiments and the modifications described above, a characteristic other than the color of the object may be used as the characteristic of the object. The characteristic other than the color of the object can include, for example, the dimension of the object and the electrical property of the object. For example, when the characteristic of the object is the dimension of the object, measurement data can be data relating to the dimension of the object, and the first value and the second value relating to the specific index can be statistical values of the dimension (a disperse indicating variance, an average value, or the like). Alternatively, for example, when the characteristic of the object is electrical activity of a heart, measurement data can be electrocardiogram data, and the first value and the second value relating to the specific index can be power spectrum obtained by Fourier-transforming the electrocardiogram data.

For example, in the embodiments and the modifications described above, a storage unit of another device connected by the communication line Ln1 may be used as the second device, instead of the second storage unit 22 of the server 20. That is, a cloud computing (cloud) information service may be used.

For example, in the embodiments and the modifications described above, the first output unit 15 that performs the first output, the second output, and the like may be provided in another device communicably connected to the measurement device 10 by near field communication or the like.

For example, in the embodiments and the modifications described above, the second output unit 24 that performs the third output and the like may be provided in another device communicably connected to the server 20 by near field communication or the like.

Note that, it is needless to say that all or part of each of the above embodiments and various modifications may be combined as appropriate without contradiction.

REFERENCE SIGNS LIST 1, 1D Measurement system
10, 10a, 10b, 10c Measurement device (first device)
11 Measurement unit
12 First storage unit
13 First control unit
13a First processing unit
13b First memory
14 First communication unit
15 First output unit
16 First input unit
20 Server (second device)
21 Second communication unit
22 Second storage unit
23 Second control unit
23a Second processing unit
23b Second memory
24 Second output unit
25 Second input unit
130 Acquisition unit
131 Reading unit
132 First calculation unit
133 First output-control unit
134 First storage-control unit
231 Second calculation unit
232 Second output-control unit
233 Second storage-control unit
234 Comparison unit
Ln1, Ln2 Communication line
P1, P2 Program
T1, T1a, T1b, T1c Terminal device

The invention claimed is:
1. A measurement system comprising:
a first device; and
a second device communicably connected to the first device, wherein
the first device comprises:
an acquisitor that acquires measurement data relating to a physical quantity of a characteristic of an object;
a storage that stores the measurement data acquired by the acquisitor;

a first calculator that calculates, from the measurement data, a first value relating to a preset specific index for the characteristic of the object; and a first communicator that transmits the measurement data and data indicating the first value to the second device, and the second device comprises:

a second communicator that receives the measurement data and the first value transmitted from the first device;

a second calculator that calculates, from the measurement data received by the second communicator, a second value relating to the specific index; and a comparer that compares the first value received by the second communicator with the second value calculated by the second calculator, wherein the second communicator transmits, in response to the comparer not recognizing that the first value has matched the second value, a preset first signal to the first device, and the first communicator retransmits, in response to reception of the first signal, the measurement data and the data indicating the first value to the second device.

2. The measurement system according to claim 1, wherein the characteristic of the object includes a color of the object.

3. The measurement system according to claim 2, wherein the measurement data includes data relating to spectral distribution of light from the object, and the specific index includes an index for the color of the object.

4. The measurement system according to claim 3, wherein the first calculator calculates, in response to the acquisitor acquiring the measurement data, the first value relating to the specific index from the measurement data, and the first communicator transmits, in response to the first calculator calculating the first value, the measurement data and the data indicating the first value to the second device.

5. The measurement system according to claim 3, wherein the second communicator transmits, in response to the comparer recognizing that the first value has matched the second value, a preset second signal to the first device, and the first device further comprises:

a first outputter that performs, in response to reception of the second signal, a preset second output in an aspect that is recognizable by a user;

an inputter that accepts a specific input according to an operation of the user; and a storage-controller that deletes, in response to the inputter accepting the specific input, the measurement data stored in the storage while the first outputter is performing the second output.

6. The measurement system according to claim 2, wherein the first calculator calculates, in response to the acquisitor acquiring the measurement data, the first value relating to the specific index from the measurement data, and the first communicator transmits, in response to the first calculator calculating the first value, the measurement data and the data indicating the first value to the second device.

7. The measurement system according to claim 2, wherein the second communicator transmits, in response to the comparer recognizing that the first value has matched the second value, a preset second signal to the first device, and the first device further comprises:

a first outputter that performs, in response to reception of the second signal, a preset second output in an aspect that is recognizable by a user;

an inputter that accepts a specific input according to an operation of the user; and a storage-controller that deletes, in response to the inputter accepting the specific input, the measurement data stored in the storage while the first outputter is performing the second output.

8. The measurement system according to claim 2, wherein the second communicator transmits, in response to the comparer recognizing that the first value has matched the second value, a preset second signal to the first device.

9. The measurement system according to claim 2, wherein the second device further comprises a second outputter that performs, in response to the comparer not recognizing that the first value has matched the second value, a preset third output in an aspect that is recognizable by the user.

10. The measurement system according to claim 1, wherein the first calculator calculates, in response to the acquisitor acquiring the measurement data, the first value relating to the specific index from the measurement data, and the first communicator transmits, in response to the first calculator calculating the first value, the measurement data and the data indicating the first value to the second device.

11. The measurement system according to claim 1, wherein the first device further comprises a first outputter that performs, in response to the reception of the first signal, a preset first output in an aspect that is recognizable by a user.

12. The measurement system according to claim 1, wherein the second communicator transmits, in response to the comparer recognizing that the first value has matched the second value, a preset second signal to the first device.

13. The measurement system according to claim 1, wherein the second device further comprises a second outputter that performs, in response to the comparer not recognizing that the first value has matched the second value, a preset third output in an aspect that is recognizable by the user.

14. A measurement system, comprising:

a first device; and a second device communicably connected to the first device, wherein the first device comprises:

an acquisitor that acquires measurement data relating to a physical quantity of a characteristic of an object;

a storage that stores the measurement data acquired by the acquisitor;

a first calculator that calculates, from the measurement data, a first value relating to a preset specific index for the characteristic of the object; and a first communicator that transmits the measurement data and data indicating the first value to the second device, and the second device comprises:

a second communicator that receives the measurement data and the first value transmitted from the first device;

a second calculator that calculates, from the measurement data received by the second communicator, a second value relating to the specific index; and a comparer that compares the first value received by the second communicator with the second value calculated by the second calculator, wherein the second communicator transmits, in response to the comparer recognizing that the first value has matched the second value, a preset second signal to the first device, and the first device further comprises:

a first outputter that performs, in response to reception of the second signal, a preset second output in an aspect that is recognizable by a user;

an inputter that accepts a specific input according to an operation of the user; and a storage-controller that deletes, in response to the inputter accepting the specific input, the measurement data stored in the storage while the first outputter is performing the second output.

15. The measurement system according to claim 14, wherein
the characteristic of the object includes a color of the object.

16. The measurement system according to claim 15, wherein
the measurement data includes data relating to spectral distribution of light from the object, and
the specific index includes an index for the color of the object.

17. A measurement system, comprising:
a first device; and
a second device communicably connected to the first device, wherein
the first device comprises:
an acquisitor that acquires measurement data relating to a physical quantity of a characteristic of an object;
a storage that stores the measurement data acquired by the acquisitor;
a first calculator that calculates, from the measurement data, a first value relating to a preset specific index for the characteristic of the object; and
a first communicator that transmits the measurement data and data indicating the first value to the second device, and
the second device comprises:
a second communicator that receives the measurement data and the first value transmitted from the first device;

a second calculator that calculates, from the measurement data received by the second communicator, a second value relating to the specific index; and a comparer that compares the first value received by the second communicator with the second value calculated by the second calculator, wherein the first device further comprises a storage-controller that deletes, in response to the reception of the second signal, the measurement data stored in the storage.

18. The measurement system according to claim 17, wherein
the characteristic of the object includes a color of the object.

19. The measurement system according to claim 18, wherein
the measurement data includes data relating to spectral distribution of light from the object, and
the specific index includes an index for the color of the object.

20. A communication processing method in a measurement system comprising a first device and a second device communicably connected to the first device, the method comprising:
(a) acquiring, by the first device, measurement data relating to a physical quantity of a characteristic of an object;
(b) storing, by the first device, the measurement data in a storage;
(c) calculating, by the first device, a first value relating to a preset specific index for the characteristic of the object from the measurement data;
(d) transmitting, by the first device, the measurement data and data indicating the first value calculated in the (c) calculating to the second device;
(e) receiving, by the second device, the measurement data and the first value transmitted in the (d) transmitting;
(f) calculating a second value relating to the specific index from the measurement data received in the (e) receiving;
(g) comparing the first value received in the (e) receiving with the second value calculated in the (f) calculating;
transmitting by the second device a preset first signal to the first device in response to the (g) comparing not recognizing that the first value has matched the second value; and
retransmitting by the first device, in response to reception of the first signal, the measurement data and the data indicating the first value to the second device.

* * * * *